United States Patent [19]
Boucot

[11] Patent Number: 5,695,158
[45] Date of Patent: Dec. 9, 1997

[54] LINE-FIXING METHOD AND SYSTEM

[75] Inventor: Bernard Boucot, Sermamagny, France

[73] Assignee: GEC Alsthom Transport SA, Paris, France

[21] Appl. No.: 575,529

[22] Filed: Dec. 20, 1995

[30] Foreign Application Priority Data

Dec. 21, 1994 [JP] Japan ................... 94 15407

[51] Int. Cl.⁶ .................................................. F16L 3/22
[52] U.S. Cl. ................ 248/49; 174/72 A; 174/138 D; 248/68.1
[58] Field of Search ........................... 248/49, 71, 68.1, 248/69, 74.1, 74.3; 174/72 A, 138 D, 153 G, 164

[56] References Cited

U.S. PATENT DOCUMENTS

| | | | |
|---|---|---|---|
| D. 291,864 | 9/1987 | Hill | 174/138 D X |
| 2,574,134 | 11/1951 | Vigcen et al. | 174/138 D X |
| 2,931,851 | 4/1960 | Sims | 174/72 A |
| 3,906,146 | 9/1975 | Taylor | 174/72 A |
| 3,910,536 | 10/1975 | Sharp et al. | 174/72 A X |
| 3,923,277 | 12/1975 | Perrault et al | 248/49 |
| 4,288,838 | 9/1981 | Von Der Vegte et al. | 174/72 A X |
| 4,395,009 | 7/1983 | Bormke | 248/68.1 |
| 4,493,018 | 1/1985 | Hopmayer et al. | 174/72 A X |
| 4,779,828 | 10/1988 | Munch | 248/74.3 |
| 4,957,251 | 9/1990 | Hubbard | 248/68.1 |
| 4,998,343 | 3/1991 | Costello | 174/72 A X |
| 5,010,642 | 4/1991 | Takahoshi et al. | 174/72 A X |
| 5,593,115 | 1/1997 | Lewis | 248/68.1 |

FOREIGN PATENT DOCUMENTS 4344144  7/1994  Germany ................... 174/70 R

*Primary Examiner*—Ramon O. Ramirez
*Assistant Examiner*—Derek J. Berger
*Attorney, Agent, or Firm*—Sughrue, Mion, Zinn, Macpeak & Seas, PLLC

[57] ABSTRACT

A system for fixing lines, in particular electrical or optical lines, is constituted by a support including octagonal perforations, the octagonal perforations being suitable for co-operating in pairs with clamps for fixing one of the lines in such a manner as to hold the line on the support on a predetermined path; and for receiving separators for separating the lines in such a manner as to prevent any contact between lines.

10 Claims, 1 Drawing Sheet

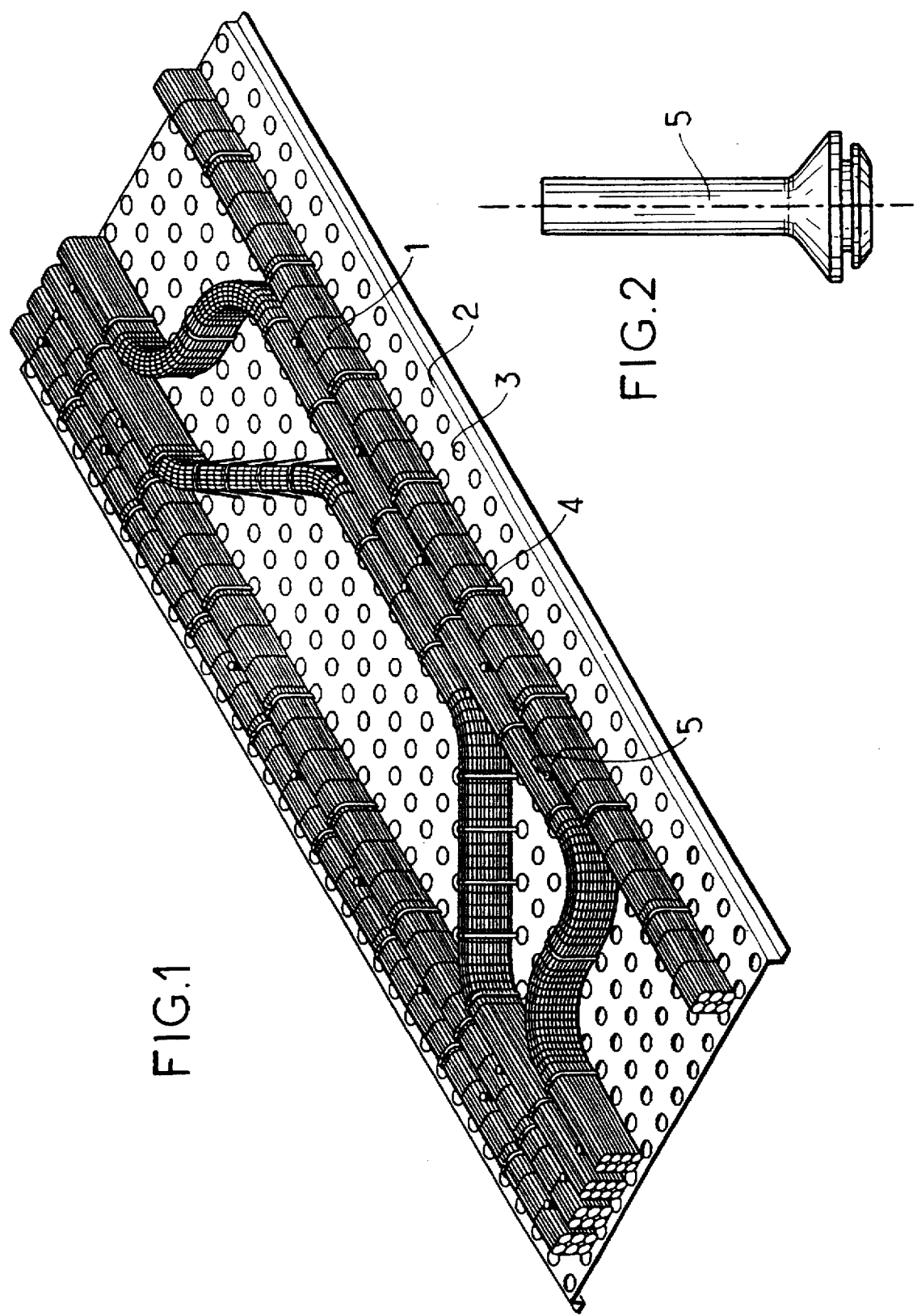

LINE-FIXING METHOD AND SYSTEM

The present invention relates to means for laying and fixing cables, particularly power or data lines in general, and more particularly it relates to a method and to a system for fixing lines.

BACKGROUND OF THE INVENTION

Lines are laid along cable paths in all technical fields at present.

Throughout the present description, the generic term "lines" designates any electrical, optical, electromagnetic, . . . , means for conveying energy or data, such as cables, cords, or harnesses, for example.

Lines that are clamped by collars are subjected to large dynamic and thermal stresses, e.g. because of vibration in rolling stock.

In the event of sudden overloads, electrodynamic forces may develop between certain lines, or more precisely between certain conductors.

These phenomena give rise to displacements over time and may be the cause of faults such as:

deterioration of line clamping;

increased individual heating caused by the amount of air between cables being reduced, thereby giving rise to premature aging of insulation;

mutual heating due to elements coming close together; and electromagnetic disturbances due to mutual induction.

Document EP 0 428 896 discloses a system for fixing energy-transporting lines.

That document describes a system for fixing energy-transporting lines that comprises at least one baseplate having an arrangement or pattern of holes made up of through holes forming rows.

The system for fixing energy-transporting lines as described also comprises line-support elements that are suitable for mounting on the baseplate.

The line-support elements comprise respectively a head for receiving at least one energy-transporting line, and a first type of leg designed to be engaged in fixed manner in said holes.

OBJECTS AND SUMMARY OF THE INVENTION

Thus, the merit of the Applicant is to propose a system for fixing lines that enables lines to be laid under optimum conditions.

Another object of the invention is a system for fixing lines that enables damage, individual heating, mutual heating, and electromagnetic disturbances to be reduced or even eliminated.

According to the invention, the system for fixing lines, in particular electrical or optical lines, is constituted by a support including perforations, said perforations being suitable:

for co-operating in pairs with fixing means for fixing one of the lines in such a manner as to hold said line on said support on a predetermined path; and for receiving separator means for separating said lines in such a manner as to prevent any contact between lines.

The invention also provides a system for fixing lines that satisfies at least one of the following characteristics:

the perforations are octagonal;

the fixing means are clamping collars;

the support is made of aluminum sheet;

the separator means for separating said lines are pegs;

the line separator comprises a peg whose end suitable for insertion in said perforations of said support is generally conical in shape;

the end of the peg suitable for being inserted in the perforations of the support is constituted by a first cone and a second cone, the first cone being directly integral with the peg and the first and second cones facing each other;

the bases of the cones are disposed facing each other and are held apart by a distance corresponding to the thickness of said support so as to enable the support to be inserted between the bases of the two cones; and the base of the second cone is preferably of smaller diameter than the base of the first cone so as to facilitate insertion of the support between the bases of the two cones.

The invention also provides a method of fixing lines, wherein at least one line is held by fixing means on a predetermined path against a support that includes perforations, said perforations being suitable for co-operating in pairs with said fixing means, and wherein said lines are kept apart from one another by separator means, said separator means being suitable for insertion in said perforations.

An advantage of the line-fixing system of the invention is that it constitutes a solution that is simple, effective, and cheap without suffering from the above-mentioned drawbacks of prior art systems.

Another advantage of the line-fixing system of the invention is that it guarantees a gap between lines that is long-lasting and that it provides positioning and guidance on the paths of cables.

Another advantage of the line-fixing system of the invention is that it provides line clamping relative to four different axes.

Another advantage of the line-fixing system of the invention is the possibility of separating lines by voltage and signal categories.

Another advantage of the line-fixing system of the invention is that it guarantees dissipation of heat due to the Joule effect.

BRIEF DESCRIPTION OF THE DRAWINGS

Other objects, characteristics, and advantages of the invention appear on reading the following description of a preferred embodiment of the line-fixing system, which description is given with reference to the accompanying drawing, in which:

FIG. 1 is a perspective view of the line-fixing system of the invention; and

FIG. 2 shows a line separator of the line-fixing system of the invention.

MORE DETAILED DESCRIPTION

FIG. 1 is a perspective view of the line-fixing system of the invention.

The system for fixing lines 1, in particular electrical lines or optical lines, is constituted by a support 2 having perforations 3.

The perforations are preferably octagonal perforations, but they could also be circular perforations or they could have some other general shape.

The perforations are suitable for co-operating in pairs with fixing means 4 for fixing one of the lines so as to hold the line against the support on a predetermined path.

The perforations are also suitable for receiving separating means 5 for separating lines so as to prevent any contact between lines.

By way of example, the fixing means 4 may be collar-clamps.

The support 2 may be a sheet of aluminum.

The line separating means 5 are, for example, pegs disposed between two lines.

FIG. 2 shows a line separator 5 of the line-fixing system of the invention.

In this preferred embodiment, the line separator 5 comprises a peg whose end suitable for insertion in a perforation 3 of the support 2 is generally conical in shape.

The end of the peg suitable for being inserted in the perforations of the support is constituted by a first cone and by a second cone, the first cone being directly integral with the peg and the firs and second cones facing each other.

The bases of the cones are disposed facing each other and they are held apart at a distance corresponding to the thickness of the support 2 so as to enable the support to be received between the bases of the two cones.

The base of the second cone is preferably a smaller diameter than the base of the first cone so as to facilitate insertion of the support between the bases of the two cones.

The invention also provides a line-fixing method.

The method is such that at least one line is held by fixing means 4 on a predetermined path on a support that includes perforations 3.

The perforations are suitable for co-operating in pairs with fixing means 4, and the lines are kept apart without contacting one another by separator means 5.

The separator means are suitable for being inserted in the perforations.

According to the invention, the method thus consists in interposing a part into a perforation without using any special tooling so as to ensure that the part is mechanically held therein.

The part is installed manually.

The shape and the material of the part are such as to avoid damaging the insulation of the lines.

I claim:

1. A system for fixing lines, in particular electrical or optical lines, the system comprising:

a support having perforations;

a plurality of unitary fixing means, each of said fixing means fitting into a pair of said perforations, for fixing one of the lines in such a manner as to hold said line on said support on a predetermined path; and a plurality of separator means, each fitting into a respective one of said perforations, for separating said lines in such a manner as to prevent any contact between said lines.

2. A system according to claim 1, in which the perforations are octagonal.

3. A system according to claim 1, in which the fixing means are clamping collars.

4. A system according to claim 1, in which the support is made of aluminum sheet.

5. A system according to claim 4, in which the separator means for separating said lines are pegs.

6. A system according to claim 1, in which each of the plurality of separator means comprises a peg having an end that is suitable for insertion in said perforations of said support, said end being generally conical in shape.

7. A system according to claim 6, in which the end of the peg is constituted by a first cone and a second cone, the first cone being directly integral with the peg.

8. A system according to claim 7, which bases of the first and second cones are disposed facing each other and are held apart by a distance corresponding to a thickness of said support so as to enable the support to be inserted between the bases of the two cones.

9. A system according to claim 8, in which the base of the second cone is preferably of smaller diameter than the base of the first cone so as to facilitate insertion of the support between the bases of the two cones.

10. A method of fixing lines, comprising the following steps:

providing a support that includes perforations;

placing at least one line on a predetermined path;

holding said at least one line on said predetermined path by fitting each of a plurality of unitary fixing means into a respective pair of said perforations on said support; and separating said at least one line from another line by fitting each of a plurality of separator means into a respective one of said perforations on said support.

* * * * *